US012684428B2

(12) United States Patent
Yu et al.

(10) Patent No.:  US 12,684,428 B2
(45) Date of Patent:      Jul. 14, 2026

(54) HANDLING OF CELL CHANGE FROM TARGET RELAY UE DURING INDIRECT PATH SWITCHING OF SIDELINK BASED U2N RELAY

(71) Applicant: Nokia Technologies Oy, Espoo (FI)

(72) Inventors: Ling Yu, Espoo (FI); Vinh Van Phan, Oulu (FI); György Tamás Wolfner, Budapest (HU)

(73) Assignee: Nokia Technologies Oy, Espoo (FI)

( * ) Notice: Subject to any disclaimer, the term of this patent is extended or adjusted under 35 U.S.C. 154(b) by 275 days.

(21) Appl. No.: 18/467,263

(22) Filed: Sep. 14, 2023

(65) Prior Publication Data

US 2024/0114400 A1      Apr. 4, 2024

(30) Foreign Application Priority Data

Sep. 29, 2022      (FI) ..................................... 20225855

(51) Int. Cl.
*H04W 36/00*          (2009.01)
*H04W 76/19*          (2018.01)

(52) U.S. Cl.
CPC . *H04W 36/0058* (2018.08); *H04W 36/00835* (2018.08); *H04W 76/19* (2018.02)

(58) Field of Classification Search
CPC ....... H04W 36/0058; H04W 36/00835; H04W 76/19; H04W 48/16; H04W 36/0061; H04W 88/04
See application file for complete search history.

(56) References Cited

U.S. PATENT DOCUMENTS

| | | | | |
|---|---|---|---|---|
| 2018/0098370 A1* | 4/2018 | Bangolae | .............. | H04W 4/023 |
| 2022/0361091 A1* | 11/2022 | Kang | ................... | H04W 48/14 |

(Continued)

FOREIGN PATENT DOCUMENTS

| | | | | |
|---|---|---|---|---|
| EP | 4535919 A1 * | 4/2025 | ............ | H04W 40/22 |
| WO | 2022/136387 A1 | 6/2022 | | |
| WO | 2022/151146 A1 | 7/2022 | | |

OTHER PUBLICATIONS

Xiaomi, "Discussion on service continuity", 3GPP TSG-RAN WG2 Meeting #116e, R2-2110220 (Year: 2021).*

(Continued)

*Primary Examiner* — Ayaz R Sheikh
*Assistant Examiner* — Mang Boi Thawng
(74) *Attorney, Agent, or Firm* — Lippes Mathias LLP

(57)      ABSTRACT

In an example embodiments, sending, by a remote user equipment (UE) of a source cell, towards a network node of the source cell a measurement report including a candidate relay (CR) list, wherein the CR list includes at least a cell identification for at least one CR UE for an indirect path switching from the source cell to a target cell associated with a CR UE; detecting a change of a serving cell or camping cell of the CR UE from the target cell to another cell based on receiving from the CR UE at least one message that indicates at least one cell identification for the CR UE is different than reported; and based on the detecting, sending an updated measurement report towards the network node triggering renewing a path switch decision or initiating a radio resource control connection re-establishment procedure with the source cell or the target cell.

16 Claims, 7 Drawing Sheets

(56) References Cited

U.S. PATENT DOCUMENTS

| | | | | |
|---|---|---|---|---|
| 2023/0171825 A1* | 6/2023 | Kuo | ...................... | H04W 76/19 |
| | | | | 370/315 |
| 2024/0107420 A1* | 3/2024 | Yu | ......................... | H04W 76/23 |
| 2024/0389180 A1* | 11/2024 | Li | ......................... | H04W 76/27 |
| 2024/0389186 A1* | 11/2024 | Chang | ................... | H04W 24/10 |
| 2025/0071640 A1* | 2/2025 | Chang | ................... | H04W 48/16 |
| 2025/0126675 A1* | 4/2025 | Zhang | ................... | H04W 76/20 |
| 2025/0175865 A1* | 5/2025 | Back | ................. | H04W 36/0061 |
| 2025/0227579 A1* | 7/2025 | Orsino | ................. | H04W 36/08 |

OTHER PUBLICATIONS

Extended European Search Report received for corresponding European Patent Application No. 23197561.6, dated Feb. 27, 2024, 13 pages.
"Summary of [621]", 3GPP TSG-RAN WG2 Meeting #117 electronic, R2-2203595, Agenda: 8.7.2.2, OPPO, Feb. 2022, 29 pages.
"[AT116bis-e][615] Support of idle/inactive relay UE in path switch (Intel)—Summary", 3GPP TSG RAN WG2 Meeting #116bis-e, R2-2201766, Agenda: 8.7.2.2, Intel Corporation, Jan. 17-25, 2022, 22 pages.
"Support of relay UE in RRC_IDLE/INACTIVE state during direct to indirect path switching", 3GPP TSG-RAN WG2 Meeting #117 Electronic, R2-2203272, Agenda: 8.7.2.1, Nokia, Feb. 21-Mar. 3, 2022, 2 pages.
"Report of [AT117-e][615][Relay] Relay running CR to 38.331 (Huawei)", 3GPP TSG-RAN WG2 Meeting #117 Electronic, R2-2203991, Agenda: 8.7.1, Huawei, Feb. 21-Mar. 3, 2022, 44 pages.
"3rd Generation Partnership Project; Technical Specification Group Radio Access Network; NR; NR and NG-RAN Overall Description; Stage 2 (Release 17)", 3GPP TS 38.300, V17.1.0, Jun. 2022, pp. 1-209.
"New WID on NR sidelink relay enhancements", 3GPP TSG RAN Meeting #94e, RP-213585, Agenda: 8.6.2, LG Electronics, Dec. 6-17, 2021, 6 pages.
Office action received for corresponding Finnish Patent Application No. 20225855, dated Feb. 23, 2023, 14 pages.
"Report of [Pre117-e][603][Relay] Open Issues on Relay Service Continuity (CATT)", 3GPP TSG RAN WG2 Meeting #117-e, R2-2202356, Agenda: 8.7.2.2, CATT, Feb. 21-Mar. 3, 2022, 27 pages.
"Summary of [Pre118-e][608][Relay] Summary of AI 6.7.2.1 on CP (Lenovo)", 3GPP TSG-RAN WG2 Meeting #118 Electronic, R2-2206339, Agenda: 6.7.2.1, Lenovo, May 9-20, 2022, 32 pages.
"Discussion on service continuity issues for Inter-gNB path switching of L2 U2N relay", 3GPP TSG-RAN WG2 Meeting #120, R2-2212253, Agenda: 8.9.3, Nokia, Nov. 14-18, 2022, 6 pages.
Office action received for corresponding Finnish Patent Application No. 20225855, dated Aug. 9, 2023, 11 pages.

* cited by examiner

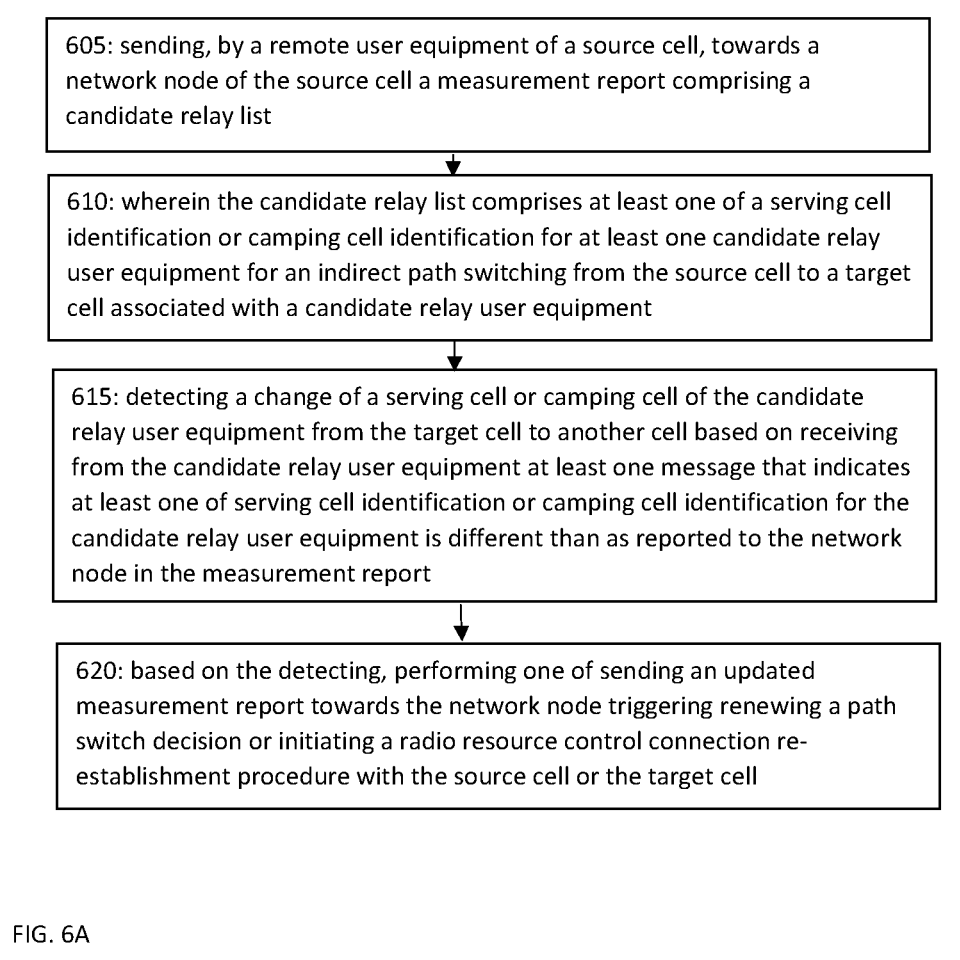

605: sending, by a remote user equipment of a source cell, towards a network node of the source cell a measurement report comprising a candidate relay list 610: wherein the candidate relay list comprises at least one of a serving cell identification or camping cell identification for at least one candidate relay user equipment for an indirect path switching from the source cell to a target cell associated with a candidate relay user equipment 615: detecting a change of a serving cell or camping cell of the candidate relay user equipment from the target cell to another cell based on receiving from the candidate relay user equipment at least one message that indicates at least one of serving cell identification or camping cell identification for the candidate relay user equipment is different than as reported to the network node in the measurement report 620: based on the detecting, performing one of sending an updated measurement report towards the network node triggering renewing a path switch decision or initiating a radio resource control connection re-establishment procedure with the source cell or the target cell

FIG. 6A

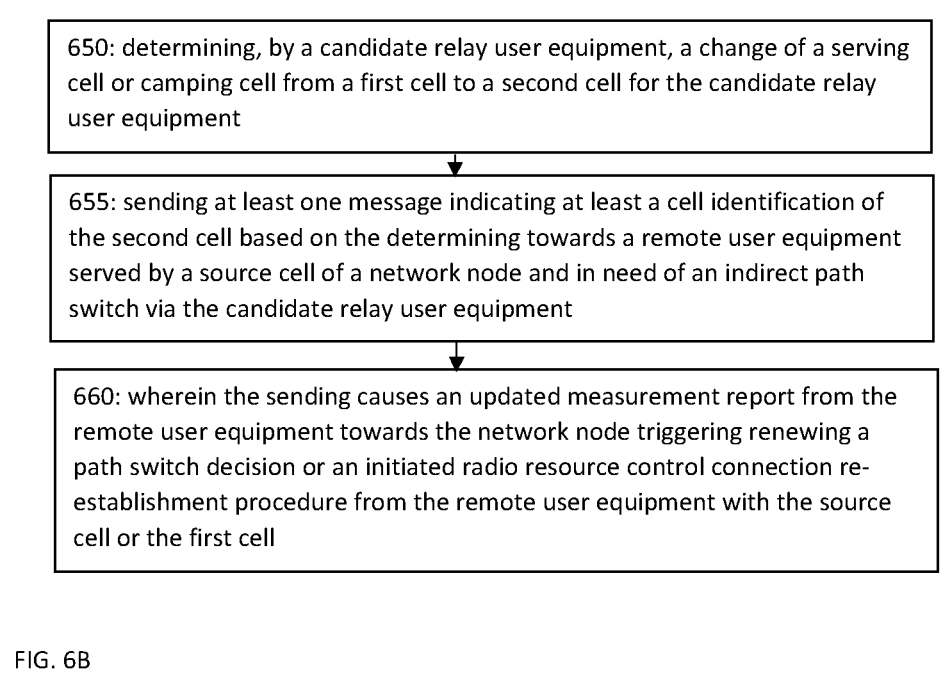

650: determining, by a candidate relay user equipment, a change of a serving cell or camping cell from a first cell to a second cell for the candidate relay user equipment 655: sending at least one message indicating at least a cell identification of the second cell based on the determining towards a remote user equipment served by a source cell of a network node and in need of an indirect path switch via the candidate relay user equipment 660: wherein the sending causes an updated measurement report from the remote user equipment towards the network node triggering renewing a path switch decision or an initiated radio resource control connection re-establishment procedure from the remote user equipment with the source cell or the first cell

FIG. 6B

HANDLING OF CELL CHANGE FROM TARGET RELAY UE DURING INDIRECT PATH SWITCHING OF SIDELINK BASED U2N RELAY

RELATED APPLICATION

The present application claims priority to, and the benefit of, Finnish Application No. 20225855, filed on Sep. 29, 2022, which is hereby incorporated by reference in its entirety.

TECHNICAL FIELD

The teachings in accordance with the example embodiments of this invention relate generally to handling cell change and, more specifically, relate to handling cell change from a target relay UE during indirect path switching with sidelink based U2N relay.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

| | |
|---|---|
| HO | Handover |
| RRC | Radio Resource Control |
| SI | System Information |
| SL | SideLink |
| UE | User Equipment |

In a communication system, when a user device of a network moves from a coverage area of an original base station of the network (or source cell) to a coverage area of a current base station of the network (or target cell), an air interface handover is triggered, that is, the user device is handed over from the original base station to the current base station. This handover may require a relay device in case the user device is in an indirect coverage area of the current base station via the relay device over a sidelink between the user device and the relay device. However, if a serving cell of the relay device changes during the handover preparation phase, problems arise, particularly if the relay UE is in RRC_IDLE/INACTIVE state.

Example embodiments of the invention work to overcome at least these problems during path switching.

SUMMARY

This section contains examples of possible implementations and is not meant to be limiting.

In an example aspect of the invention, there is an apparatus, such as a user equipment side apparatus, comprising: at least one processor; and at least one non-transitory memory including computer program code storing instructions that, when executed by the at least one processor, cause the apparatus at least to perform: sending, by a remote user equipment of a source cell, towards a network node of the source cell a measurement report comprising a candidate relay list, wherein the candidate relay list comprises at least one of a serving cell identification or camping cell identification for at least one candidate relay user equipment for an indirect path switching from the source cell to a target cell associated with a candidate relay user equipment; detecting a change of a serving cell or camping cell of the candidate relay user equipment from the target cell to another cell based on receiving from the candidate relay user equipment at least one message that indicates at least one of serving cell identification or camping cell identification for the candidate relay user equipment is different than as reported to the network node in the measurement report; and based on the detecting, performing one of sending an updated measurement report towards the network node triggering renewing a path switch decision or initiating a radio resource control connection re-establishment procedure with the source cell or the target cell.

In another example aspect of the invention, there is a method comprising: sending, by a remote user equipment of a source cell, towards a network node of the source cell a measurement report comprising a candidate relay list, wherein the candidate relay list comprises at least one of a serving cell identification or camping cell identification for at least one candidate relay user equipment for an indirect path switching from the source cell to a target cell associated with a candidate relay user equipment; detecting a change of a serving cell or camping cell of the candidate relay user equipment from the target cell to another cell based on receiving from the candidate relay user equipment at least one message that indicates at least one of serving cell identification or camping cell identification for the candidate relay user equipment is different than as reported to the network node in the measurement report; and based on the detecting, performing one of sending an updated measurement report towards the network node triggering renewing a path switch decision or initiating a radio resource control connection re-establishment procedure with the source cell or the target cell.

A further example embodiment is an apparatus and a method comprising the apparatus and the method of the previous paragraphs, wherein the at least one message comprises a discovery message that indicates the at least one of serving cell identification or camping cell identification for the candidate relay user equipment is different than as reported to the network node in the measurement report, wherein there is identifying a path switch decision to use the candidate relay user equipment of the candidate relay list being configured from the network node for the path switch, wherein the identifying is based on receiving a radio resource control reconfiguration message from the network node to configure the remote user equipment for path switching via the candidate relay user equipment, wherein there is initiating a radio resource control connection re-establishment procedure with the source cell or the target cell, wherein the initiating is based on that the change of the serving cell or camping cell of the candidate relay user equipment detected one of after identifying the path switch decision or after receiving the radio resource control reconfiguration message from the network node to configure the remote user equipment for path switching via the candidate relay user equipment, wherein there is establishing a direct connection with the candidate relay user equipment being configured from the network node, wherein there is, during or after the direct connection establishment, receiving from the candidate relay user equipment system information comprising a cell identification of a current serving cell or camping cell of the candidate relay user equipment used to identify a cell change of the candidate relay user equipment, wherein the at least one message comprises the system information from the candidate relay user equipment received during or after the remote user equipment establishes the direct connection with the candidate relay user equipment, wherein the candidate relay user equipment is in an idle or inactive state, and wherein the candidate relay user equipment in the idle or inactive state has performed cell reselection from the target cell to another cell causing the cell change of the candidate relay user equipment with a different at least one of serving cell identification or camping cell identification for the candidate relay user equipment, wherein the updated measurement report comprises an updated candidate relay list indicating the different at least one of a serving cell identification or camping cell identification for the candidate relay user equipment, and/or wherein the updated measurement report is triggered based on the remote user equipment not yet receiving a radio resource control reconfiguration message from the network node to configure the remote user equipment for path switching via the candidate relay user equipment.

A non-transitory computer-readable medium storing program code, the program code executed by at least one processor to perform at least the method as described in the paragraphs above.

In another example aspect of the invention, there is an apparatus comprising: means for sending, by a remote user equipment of a source cell, towards a network node of the source cell a measurement report comprising a candidate relay list, wherein the candidate relay list comprises at least one of a serving cell identification or camping cell identification for at least one candidate relay user equipment for an indirect path switching from the source cell to a target cell associated with a candidate relay user equipment; means for detecting a change of a serving cell or camping cell of the candidate relay user equipment from the target cell to another cell based on receiving from the candidate relay user equipment at least one message that indicates at least one of serving cell identification or camping cell identification for the candidate relay user equipment is different than as reported to the network node in the measurement report; and means, based on the detecting, for performing one of sending an updated measurement report towards the network node triggering renewing a path switch decision or initiating a radio resource control connection re-establishment procedure with the source cell or the target cell.

In accordance with the example embodiments as described in the paragraph above, at least the means for sending, detecting, and performing comprises a network interface, and computer program code stored on a computer-readable medium and executed by at least one processor.

In another example aspect of the invention, there is an apparatus, such as another user equipment side apparatus, comprising: at least one processor; and at least one non-transitory memory including computer program code storing instructions that, when executed by the at least one processor, cause the apparatus at least to perform: determining, by a candidate relay user equipment, a change of a serving cell or camping cell from a first cell to a second cell for the candidate relay user equipment; and sending at least one message indicating at least a cell identification of the second cell based on the determining towards a remote user equipment served by a source cell of a network node and in need of an indirect path switch via the candidate relay user equipment, wherein the sending causes an updated measurement report from the remote user equipment towards the network node triggering renewing a path switch decision or an initiated radio resource control connection re-establishment procedure from the remote user equipment with the source cell or the first cell.

In another example aspect of the invention, there is a method comprising: determining, by a candidate relay user equipment, a change of a serving cell or camping cell from a first cell to a second cell for the candidate relay user equipment; and sending at least one message indicating at least a cell identification of the second cell based on the determining towards a remote user equipment served by a source cell of a network node and in need of an indirect path switch via the candidate relay user equipment, wherein the sending causes an updated measurement report from the remote user equipment towards the network node triggering renewing a path switch decision or an initiated radio resource control connection re-establishment procedure from the remote user equipment with the source cell or the first cell.

A further example embodiment is an apparatus and a method comprising the apparatus and the method of the previous paragraphs, wherein the at least one message comprises a discovery message that indicates the at least one of serving cell identification or camping cell identification for the candidate relay user equipment, wherein there is establishing a direct connection with the remote user equipment, as requested by the remote user equipment, wherein there is, during or after the direct connection establishment, sending towards the remote user equipment system information comprising a cell identification of a current serving cell or camping cell of the candidate relay user equipment used to identify a cell change of the candidate relay user equipment, wherein the at least one message comprises the system information from the candidate relay user equipment sent during or after the remote user equipment establishes the direct connection with the candidate relay user equipment, wherein the candidate relay user equipment is configured to send the system information based on the at least one message for every direct connection establishment after every determined cell change within a configured time interval starting from a time instance the cell change is determined at the candidate relay user equipment, wherein the candidate relay user equipment is in an idle or inactive state, wherein the candidate relay user equipment in the idle or inactive state has performed cell reselection from the first cell to the second cell causing the cell change of the candidate relay user equipment with a different at least one of serving cell identification or camping cell identification for the candidate relay user equipment, wherein the candidate relay user equipment is configured to send one or more discovery messages as for the at least one message after every determined cell change within a configured time interval starting from a time instance the cell change is determined at the candidate relay user equipment, wherein the sending is implemented in access stratum layer, and/or wherein the sending is implemented by upper layers above access stratum layer.

A non-transitory computer-readable medium storing program code, the program code executed by at least one processor to perform at least the method as described in the paragraphs above.

In another example aspect of the invention, there is an apparatus comprising: means for determining, by a candidate relay user equipment, a change of a serving cell or camping cell from a first cell to a second cell for the candidate relay user equipment; and means for sending at least one message indicating at least a cell identification of the second cell based on the determining towards a remote user equipment served by a source cell of a network node and in need of an indirect path switch via the candidate relay user equipment, wherein the sending causes an updated measurement report from the remote user equipment towards the network node triggering renewing a path switch decision or an initiated radio resource control connection re-establishment procedure from the remote user equipment with the source cell or the first cell.

In accordance with the example embodiments as described in the paragraph above, at least the means for determining and sending comprises a network interface, and computer program code stored on a computer-readable medium and executed by at least one processor.

A communication system comprising the apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 6A and FIG. 6B each show a method in accordance with example embodiments of the invention which may be performed by an apparatus.

DETAILED DESCRIPTION

Example embodiments of the invention provide at least a method and apparatus to perform cell change from a target relay UE during indirect path switching with sidelink (SL) based UE-to-Network (U2N) relay.

Example embodiments of the invention are targeted for support of NR SL based U2N relay. In particular, example embodiments of this invention are related to support service continuity during indirect path switching of remote UE using SL based U2N relay.

Figure 1:
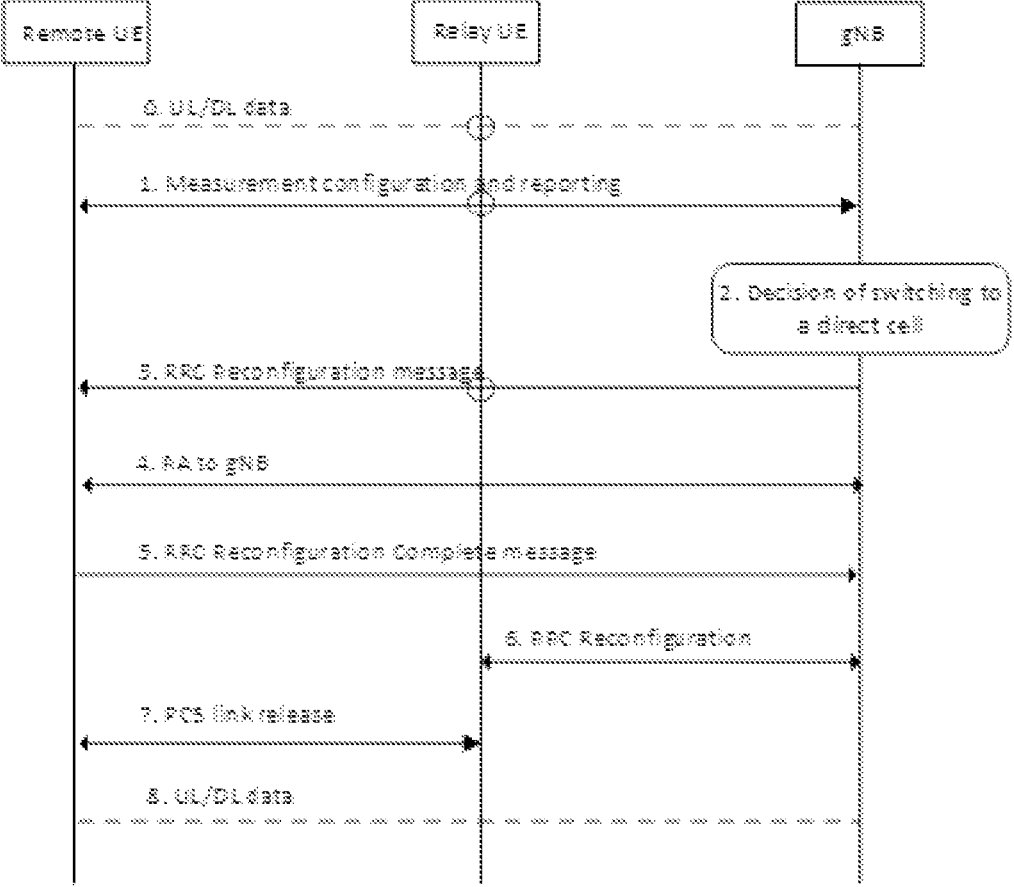
FIG. 1 (FIG. 16.12.6.1-1 from 3GPP TS 38.300) shows a baseline procedure for a remote UE switching from direct path to indirect path via a relay UE.

The baseline procedure for remote UE switching from direct path to indirect path via relay UE within the same gNB is captured in FIG. 1 (FIG. 16.12.6.1-1 from 3GPP TS 38.300).

The U2N Remote UE reports one or multiple candidate U2N Relay UE(s) and Uu measurements, after it measures/discovers the candidate U2N Relay UE(s):

The Remote UE may filter the appropriate U2N Relay UE(s) according to Relay selection criteria before reporting. The Remote UE shall report only the U2N Relay UE candidate(s) that fulfil the higher layer criteria;

The reporting can include at least U2N Relay UE identifier (ID), U2N Relay UE's serving cell ID, and sidelink measurement quantity information. The sidelink measurement quantity is the Sidelink Discovery-Reference Signal Received Power (SD-RSRP);

2. The gNB decides to switch the U2N Remote UE to a target U2N Relay UE. Then the gNB sends an RRCReconfiguration message to the target U2N Relay UE, which can include at least Remote UE's local ID and L2 ID, Uu air interface between UE and gNB and PC5 air interface between UEs over sidelink Relay Radio Link Control (RLC) channel configuration for relaying, and bearer mapping configuration;

3. The gNB sends the RRCReconfiguration message to the U2N Remote UE. The contents in the RRCReconfiguration message can include at least U2N Relay UE identifier, PC5 Relay Radio Link Control channel configuration for relay traffic and the associated end-to-end radio bearer(s). The U2N Remote UE stops User Plane (UP) and control plane (CP) transmission over Uu after reception of RRCReconfiguration message from the gNB;

4. The U2N Remote UE establishes PC5 connection with target U2N Relay UE;

5. The U2N Remote UE completes the path switch procedure by sending the RRCReconfigurationComplete message to the gNB via the Relay UE; and 6. The data path is switched from direct path to indirect path between the U2N Remote UE and the gNB.

Figure 2:
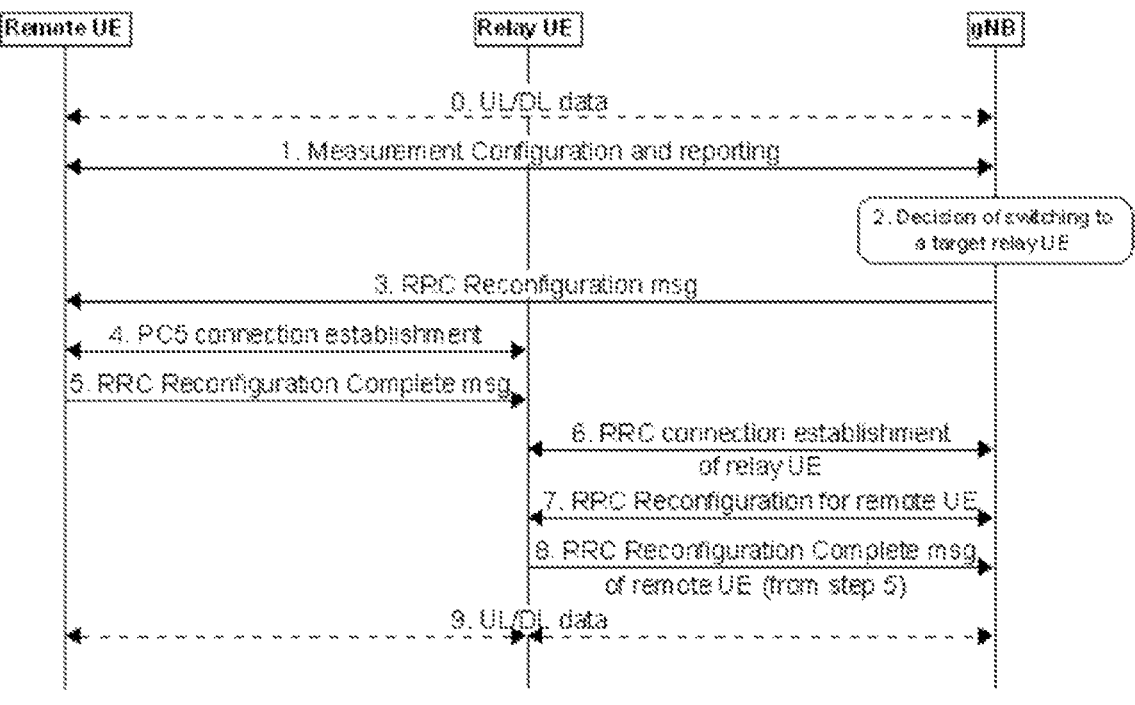
FIG. 2 shows a procedure for a remote UE switching from direct path to indirect path via a relay UE in RRC_IDLE or in RRC_INACTIVE state.

The relay UE in FIG. 1 can be in any RRC state. If relay UE is in RRC_IDLE or RRC_INACTIVE, the U2N Remote UE establishes a PC5 link with the U2N Relay UE (i.e., step 4 in FIG. 1) upon receiving path switching command (i.e., step 3 in FIG. 1) and sends the RRCReconfigurationComplete message via the U2N Relay UE, which will trigger the U2N Relay UE to enter RRC_CONNECTED state (as shown in FIG. 2).

3GPP standards based relay enhancements at the time of this application includes an objective to enhance service continuity for single-hop L2 UE-to-NW relay for the following scenarios:

A. Inter-gNB indirect-to-direct path switching (i.e., "remote UE<->relay UE A<->gNB X" to "remote UE<->gNB Y");

B. Inter-gNB direct-to-indirect path switching (i.e., "remote UE<->gNB X" to "remote UE<->relay UE A<->gNB Y");

C. Intra-gNB indirect-to-indirect path switching (i.e., "remote UE<->relay UE A<->gNB X" to "remote UE<->relay UE B<->gNB X");

D. Inter-gNB indirect-to-indirect path switching (i.e., "remote UE<->relay UE A<->gNB X" to "remote UE<->relay UE B<->gNB Y").

Note 2A: Scenario D is to be supported by reusing solutions for the other scenarios without specific optimizations.

For scenario B, C and D, it was already agreed in 3GPP the relay UE can be in any RRC state. The procedures as illustrated in FIG. 1 for intra-gNB direct to indirect path switching are used as a baseline for inter-gNB direct to indirect path switching with addition of necessary inter-gNB signaling over the Xn interface. The standardized mechanism for the remote UE to trigger the target U2N relay UE in RRC_IDLE/INACTIVE state to transition to the RRC_CONNECTED state should also be applicable to other standardized inter/intra-gNB scenarios.

FIG. 2 depicts the procedure for intra-gNB case when the target Relay UE is in RRC_IDLE/INACTIVE state:

1. Same as step 1 in FIG. 1;
2. The gNB decides to switch the Remote UE (L2 U2N Remote UE) to a target L2 U2N Relay UE, which is in RRC_IDLE or RRC_INACTIVE state;
3-4. Same as step 3 and 4 in FIG. 1;
5. The Remote UE sends the RRCReconfigurationComplete over PC5 to the L2 U2N Relay UE;
6. Step 5 triggers the L2 U2N Relay UE to establish the RRC connection over Uu;
7. Same as step 2 in FIG. 1;
8. The L2 U2N Relay UE forwards the RRCReconfigurationComplete over Uu received in Step 5; and
9. Same as step 6 in FIG. 1.

According to the baseline procedure illustrated in FIG. 1, the measurement report from the remote UE to the serving or source gNB includes the candidate relay UEs' information such as relay UE ID, relay UE's serving cell ID, SL measurement quantity information, etc. Based on those information elements, the gNB makes the decision of path switching and select the target relay UE for the remote UE. Herein, the gNB will use reported relay UE's serving cell ID to identify which cell will serve the remote UE as the target cell for indirect path switching. In case of inter-gNB direct-to-indirect path switching (scenario B) or inter-gNB indirect-to-indirect path switching (scenario D), the target gNB of target relay UE's serving cell will be requested by the source gNB via Xn to provide RRC configuration for the remote UE to make the path switching. Thus, it is the gNB corresponding to relay UE's serving cell reported by the remote UE to provide the RRC configuration parameters for the remote UE to make the path switching.

Considering that the target relay UE is in RRC_IDLE or RRC_INACTIVE state, the serving cell of the relay UE should be the cell the relay UE is camping on. The camping cell ID (assuming cell #A) of the relay UE will be included in relay discovery message and will be discovered and reported by the remote UE to the gNB as part of the candidate relay UE's information in the measurement report. So, the target gNB of the relay UE's camping cell (cell #A) will provide RRC reconfiguration parameters for the remote UE's path switching. When the remote UE receives the RRC reconfiguration message from the serving or source gNB (i.e., step 3 in FIG. 1 or FIG. 2), the remote UE needs to send RRC reconfiguration complete message to the target gNB via the relay UE, which triggers the relay UE to establish its own RRC connection with the target gNB corresponding to its current camping cell (i.e., step 6 in FIG. 2).

The problem arises if the relay UE in RRC_IDLE/INACTIVE state has made the cell reselection to another cell (assuming cell #B) during the path switching preparation phase of the remote UE (i.e., the time period between measurement report from the remote UE to the serving gNB in step 1 of FIG. 2 and PC5 connection establishment completed in step 4 of FIG. 2). This is because the relay UE will establish RRC connection with cell #B instead of cell #A. Thus, the RRC reconfiguration complete message of the remote UE will be relayed to the wrong cell (i.e., cell #B instead of cell #A), causing failure of the indirect path switching of the remote UE.

In case of inter-gNB direct-to-indirect or indirect-to-indirect path switching, if the source gNB is responsible for selecting the target relay UE that is served by the target gNB, the relay UE in RRC_CONNECTED state may make HO during path switching phase, which will cause the same path switching failure as described above for the case considering the relay UE in RRC_IDLE/INACTIVE state. Note that it is open whether the source gNB or the target gNB is responsible for selecting the target relay UE.

Example embodiments of the invention are targeted to the failure scenario described above and focus on remote UE's behaviour to identify the failure and make faster failure recovery.

Figure 5:
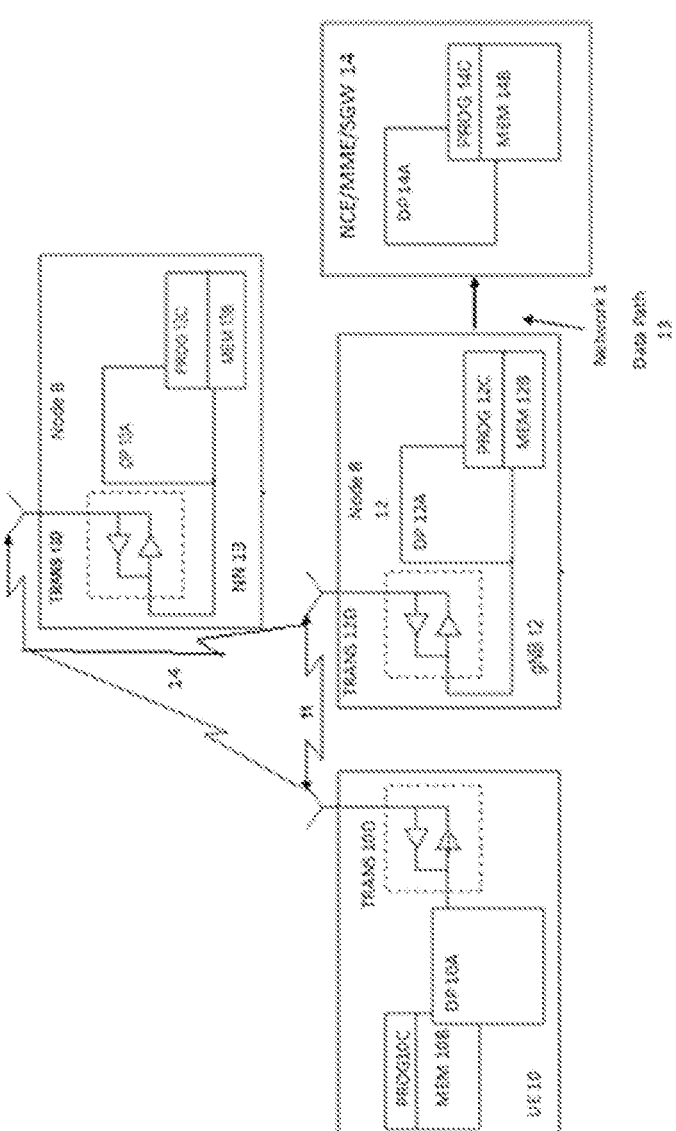
FIG. 5 shows a high level block diagram of various devices used in carrying out various aspects of the invention.

Before describing the example embodiments of the invention in detail, reference is made to FIG. 5 for illustrating a simplified block diagram of various electronic devices that are suitable for use in practicing the example embodiments of this invention.

FIG. 5 shows a block diagram of one possible and non-limiting system in which the example embodiments of the invention may be practiced. In FIG. 5, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to gNB 12 and NN 13, respectively. The one or more memories MEM 10B include computer program code PROG 10C. The UE 10 communicates with gNB 12 and/or NN 13 via a wireless link 111.

The gNB 12 (NR/5G Node B or possibly an evolved NB) is a base station such as a master or secondary node base station (e.g., for NR or LTE long term evolution) that communicates with devices such as NN 13 and UE 10 of FIG. 5. The gNB 12 provides access to wireless devices such as the UE 10 to the wireless network 1. The gNB 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the gNB 12 to perform one or more of the operations as described herein. The gNB 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/MME/SGW device such as the NCE/MME/SGW 14 of FIG. 5.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the gNB 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the gNB 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/SGW device such as the NCE/MME/SGW 14 of FIG. 5. The NCE/MME/SGW 14 including MME (Mobility Management Entity)/SGW (Serving Gateway) functionality, such as User Plane Functionalities, and/or an Access Management functionality for LTE and similar functionality for 5G.

The one or more buses of the device of FIG. 5 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the gNB 12 being physically in a different location from the RRH, and the one or more buses 157 could be implemented in part as fiber optic cable to connect the other elements of the gNB 12 to a RRH.

It is noted that although FIG. 5 shows a network node or base station such as the gNB 12 as in FIG. 5 and mobility management device such as the NN 13 as in FIG. 5, these devices can incorporate or be incorporated into an eNodeB or eNB or gNB such as for LTE and NR, and would still be configurable to perform example embodiments of the invention as described in this application.

Also, it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE/MME/SGW) 14 that may include NCE (Network Control Element), MME (Mobility Management Entity)/SGW (Serving Gateway) functionality, and which provides connectivity with a further network, such as a telephone network and/or a data communications network (e.g., the Internet). The gNB 12 and the NN 13 are coupled via a link 13 and/or link 14 to the NCE/MME/SGW 14. In addition, it is noted that the operations in accordance with example embodiments of the invention, as performed by the NN 13, may also be performed at the NCE/MME/SGW 14.

The NCE/MME/SGW 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10A, DP12A, DP13A, and/or DP14A and memories MEM 10B, MEM 12B, MEM 13B, and/or MEM 14B, and also such virtualized entities create technical effects.

The computer readable memories MEM 10B, MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 10B, MEM 12B, MEM 13B, and MEM 14B may be means for performing storage functions. The processors DP10A, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10A, DP12A, DP13A, and DP14A may be means for performing functions, such as controlling the UE 10, gNB 12, NN 13, NCE/MME/SGW 14 and other functions as described herein.

As similarly stated above, this invention is targeted to the failure scenario described above and focus on remote UE's behaviour to identify the failure and make faster failure recovery.

The Notification message procedure in sidelink was specified in 3GPP standards for relay UE to send Notification-MessageSidelink to the connected remote UE in the following scenario:

> upon Uu RLF happens to relay UE
> upon HO is configured to relay UE
> upon cell reselection from relay UE
> upon RRC connection establish/resume failure.

The NotificationMessageSidelink from relay UE will trigger the remote UE in RRC_CONNECTED state (this is the case for remote UE performing path switching) to initiate RRC connection re-establishment procedure.

The specified Notification message procedure in sidelink can only be applied between relay UE and connected remote UE. In the scenario that the problem is identified above, relay UE and remote UE may not have PC5 connection established yet when relay UE makes cell change either due to cell reselection or handover (HO). Therefore, the Notification message procedure cannot solve the problem in order to avoid path switching failure if relay UE makes a cell change during path switching preparation phase and there is no PC5 connection established between relay UE and remote UE.

Example embodiments of this invention proposes remote UE's behaviour after detecting a change of serving/camping cell of the relay UE that has been reported by the remote UE to the serving gNB (source gNB) as the candidate relay UE or has been configured by the serving gNB or by the target gNB via the serving gNB as the target relay UE for indirect path switching of the remote UE. The change of serving/ camping cell of the relay UE may be identified or detected by the remote UE, e.g., either upon receiving the upcoming relay discovery (RD) message from the relay UE after the remote UE reported the relay UE as candidate relay UE, or upon receiving the transferred System Information (SI) from the relay UE after the remote UE establishes the PC5 connection with the target relay UE configured from the gNB. The received RD message or SI from the relay UE indicates a new serving/camping cell ID of the relay UE different from that indicated before by the relay UE and reported to the serving gNB by the remote UE. When the remote UE detected the relay UE has changed the serving/ camping cell, the remote UE may be configured or triggered to perform the following actions:

The remote UE may be configured to trigger another measurement report when it receives relay discovery message from the relay UE that is included in the candidate relay list reported to the gNB and the relay discovery message indicates the relay UE's serving/ camping cell ID is different from the one reported to the gNB in the candidate relay list. This means a new trigger for measurement report from the remote UE needs to be specified and/or configured from the gNB;

In addition to or instead of triggering another measurement report, the remote UE may be triggered to initiate RRC connection re-establishment procedure instead of responding with RRC reconfiguration complete message via the relay UE if the remote UE identifies the latest serving/camping cell of the target relay UE is different from the target cell ID that the remote UE is configured to connect to. This means a new condition of initiating RRC connection re-establishment procedure needs to be specified.

Figure 3:
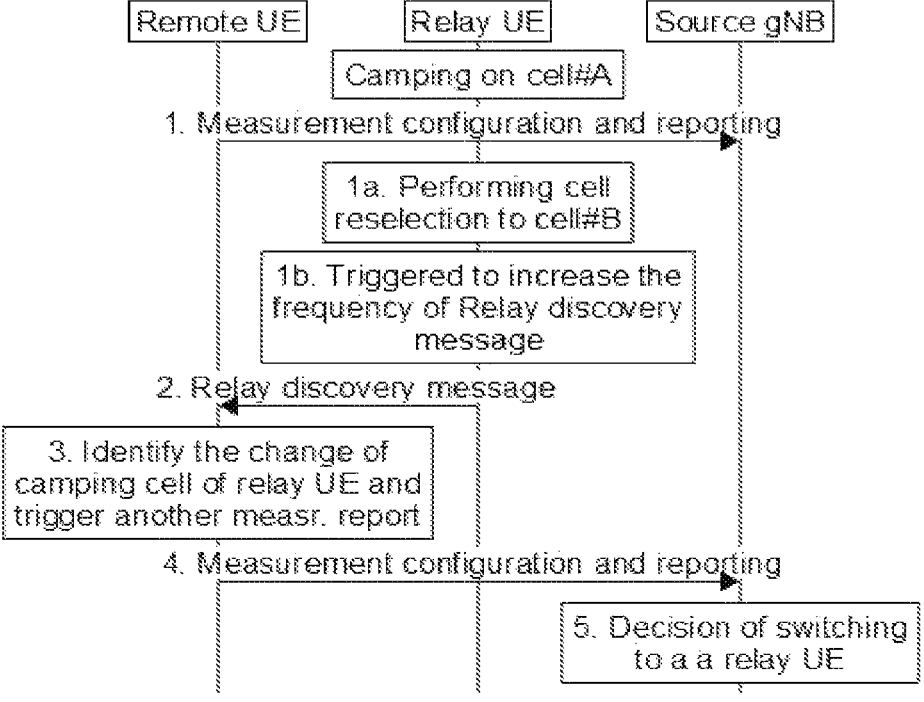
FIG. 3 shows an illustration of some example embodiments of the invention.
Figure 4:
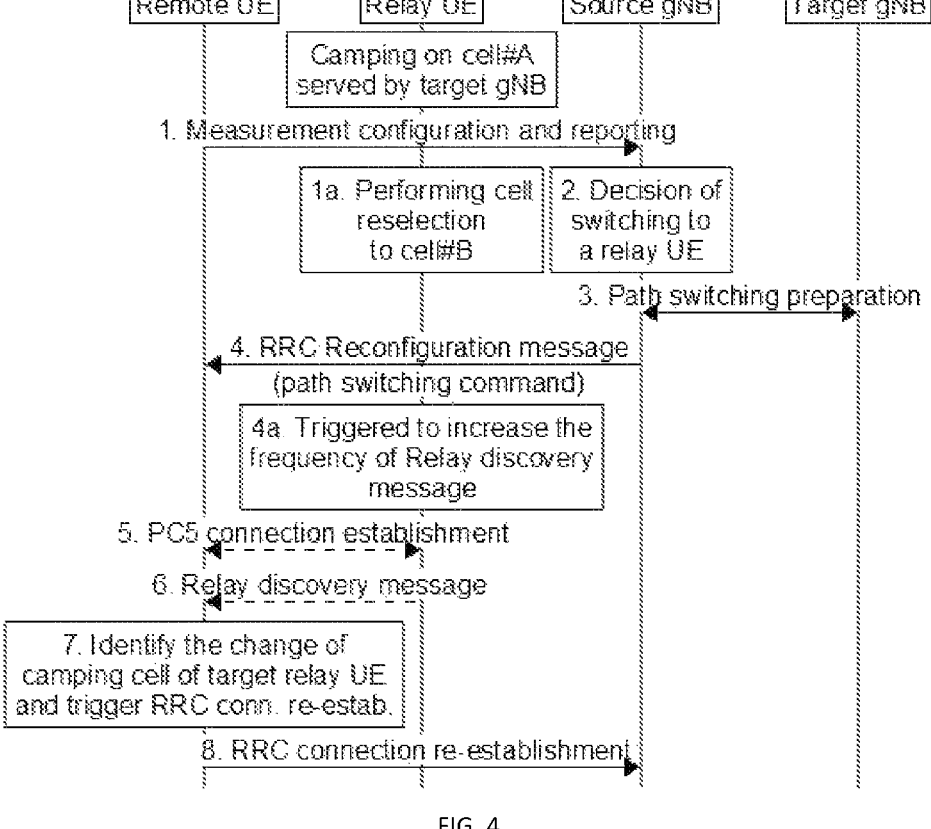
FIG. 4 shows an illustration of further example embodiments of the invention.

Example embodiments of the invention are given in FIG. 3 and FIG. 4. It is assumed therein that the relay UE is in RRC_IDLE/INACTIVE state and camping in cell #A when the remote UE has discovered the relay UE and reported the relay UE as one of the candidate relay UE(s) to the gNB in measurement report in step 1 of FIG. 3 and FIG. 4.

It may happen that, not long after the remote UE sent the measurement report to the gNB, the relay UE in RRC_IDLE/INACTIVE state may perform cell reselection and camp to another cell, e.g., cell #B. If the relay UE sends a new relay discovery message after the cell reselection to cell #B indicating ID of cell #B, the remote UE may identify the cell ID of cell #B included in the newly received relay discovery message from the relay UE is different from the cell ID of cell #A that the remote UE has reported to the gNB in the candidate relay UE list and associated with the relay UE in question. Upon identifying the change of the serving/ camping cell from the relay UE, the remote UE may be triggered to send another measurement report to indicate the candidate relay UE list with the updated cell ID associated with the relay UE in question. The measurement report may be triggered only if the remote UE has not yet received the RRC reconfiguration message from the gNB to configure the remote UE for path switching via the relay UE. This means the gNB may not make the path switching decision yet or at least may not issue the RRC reconfiguration message to the remote UE yet for path switching configuration. The new measurement report with the new cell ID of the relay UE can trigger the gNB to either make or renew the path switching decision to the correct cell. To facilitate the remote UE to detect the cell change of the relay UE for triggering another measurement report as early as possible, the relay UE may be configured to send one or more additional relay discovery message(s) after every cell change within a configured time interval starting from the time instance of the cell reselection decision at the relay UE. This may be implemented in access stratum layer to allow the relay UE to send additional relay discovery messages with the new cell ID. Or it can be implemented by upper layer with cross layer interaction upon receiving the change or update of cell ID from access stratum layer at the relay UE. It means when the relay UE selects a new cell or is handed over to a new cell, the access stratum layer of the UE indicates to the upper layer (e.g., non-access stratum layer or application layer) cell ID of the new cell (the change of the cell ID). This triggers the upper layer that is responsible for controlling/managing relay discovery message transmission to send one or more additional relay discovery message(s).

Depending on the time instance when the relay UE performs the cell reselection and/or when additional discovery message is sent by the relay UE, the remote UE may not have enough time to identify the change of camping cell of the relay UE and, based on that, send another or updated measurement report to the serving gNB before the gNB makes decision of indirect path switching and sends RRC reconfiguration message to the remote UE. In this case, the remote UE may request PC5 connection establishment with the relay UE, as expected. Upon PC5 connection establishment between the remote UE and the relay UE, the relay UE may forward the SIs (e.g., System Information Block #1 (SIB1), as there are a number of indexed SIB #specified in standards at the time of this application, that contains cell ID of the current serving/camping cell of the relay UE) to the remote UE, which may be used by the remote UE to identify the cell change of the relay UE. According to the current 3GPP standards, it's up to the relay UE's implementation to forward SIB1 to the remote UE based on the remote UE's request or use unsolicited forwarding of SIB1. Herein to facilitate the remote UE to identify the change of serving/ camping cell from the relay UE, the relay UE may be configured to forward at least SIB1 upon establishment of PC5 connection with the remote UE, which may be also conditioned to perform the unsolicited forwarding of SIB1 within a configured time interval starting from the time instance of the cell reselection decision at the relay UE. Or the remote UE may receive another relay discovery message from the relay UE after receiving RRC reconfiguration message. If the cell ID in the newly received relay discovery message or identified from forwarded SI is not the same as the target cell ID that is indicated in the received RRC reconfiguration message, the remote UE can also identify the change of the camping cell from the relay UE. Thus, the remote UE is triggered to initiate RRC connection re-establishment procedure with either the source cell or the target cell instead of responding with RRC reconfiguration complete message as in baseline procedure.

The above implementation examples assume the relay UE in RRC_IDLE/INACTIVE state makes cell reselection during the remote UE's path switching either before or after the serving or source gNB makes path switching decision. The same problem of paths switching failure will happen in the case when the relay UE in RRC_CONNECTED state makes HO after the gNB sent RRC Reconfiguration message to the remote UE in step 4 of FIG. 4. The proposed solution as illustrated in FIG. 4 can be applied for this case, too.

FIG. 3 and FIG. 4 each show an illustration of some example embodiments of the invention.

Example embodiments of the invention as shown in FIG. 3 include operations of a Remote UE, a Relay UE, and a Source gNB. As shown in FIG. 3 the Relay UE is camping on cell #A. As shown in step 1 of FIG. 3 the Remote UE sends a measurement configuration and reporting message to the source gNB. As shown in step 1*a* of FIG. 3 the Relay UE is performing cell reselection to cell #B. As shown in step 1*b* of FIG. 3 the Relay UE is triggered to increase frequency of a relay discovery message. As shown in step 2 of FIG. 3 the Relay UE sends to the Remote UE a relay discovery message. As shown in step 3 of FIG. 3 the Remote UE identifies a change of camping cell of the relay UE and triggers another measurement report. As shown in step 4 of FIG. 3 the Remote UE sends to the source gNb measurement configuration and reporting messaging. Then as shown in step 5 of FIG. 3 the Source gNB makes a decision of switching to a relay UE.

Example embodiments of the invention as shown in FIG. 4 include operations of a Remote UE, a Relay UE, Source gNB, and Target gNB. As shown in FIG. 4 the Relay UE is camping on cell #A served by the target gNB. As shown in step 1 of FIG. 4 the Remote UE sends a measurement configuration and reporting message to the source gNB. As shown in step 1*a* of FIG. 4 the Relay UE is performing cell reselection to cell #B. As shown in step 2 of FIG. 4 the Source gNB makes a decision of switching to a relay UE. As shown in step 3 of FIG. 4 there is a path switching operation between the Source gNB and the Target gNB. As shown in step 4 of FIG. 4 the Source gNB sends to the Remote UE an RRC reconfiguration message (path switching command) As shown in step 4*a* of FIG. 4 the Relay UE is triggered to increase frequency of a relay discovery message. As shown in step 5 of FIG. 4 there is PC5 connection establishment between the Remote UE and the Relay UE. As shown in step 6 of FIG. 4 the Relay UE sends to the Remote UE a relay discovery message. As shown in step 7 of FIG. 4 the Remote UE is identifying the change of camping cell of target relay UE and triggering RRC connection re-establishment. Then as shown in step 8 of FIG. 4 the Remote UE sends towards the Source gNB an RRC connection re-establishment message.

FIG. 6A and FIG. 6B each show a method in accordance with example embodiments of the invention which may be performed by an apparatus.

FIG. 6A illustrates operations which may be performed by a device such as, but not limited to, a remote user device (e.g., the UE 10 as in FIG. 5). As shown in step 605 of FIG. 6A there is sending, by a remote user equipment of a source cell, towards a network node of the source cell a measurement report comprising a candidate relay list. As shown in step 610 of FIG. 6A wherein the candidate relay list comprises at least one of a serving cell identification or camping cell identification for at least one candidate relay user equipment for an indirect path switching from the source cell to a target cell associated with a candidate relay user equipment. As shown in step 615 of FIG. 6A there is detecting a change of a serving cell or camping cell of the candidate relay user equipment from the target cell to another cell based on receiving from the candidate relay user equipment at least one message that indicates at least one of serving cell identification or camping cell identification for the candidate relay user equipment is different than as reported to the network node in the measurement report.

Then as shown in step 620 of FIG. 6A there is, based on the detecting, performing one of sending an updated measurement report towards the network node triggering renewing a path switch decision or initiating a radio resource control connection re-establishment procedure with the source cell or the target cell.

In accordance with the example embodiments as described in the paragraph above, wherein the at least one message comprises a discovery message that indicates the at least one of serving cell identification or camping cell identification for the candidate relay user equipment is different than as reported to the network node in the measurement report.

In accordance with the example embodiments as described in the paragraphs above, wherein the at least one non-transitory memory including computer program code storing instructions is executed by the at least one processor to cause the apparatus at least to perform: identifying a path switch decision to use the candidate relay user equipment of the candidate relay list being configured from the network node for the path switch, wherein the identifying is based on receiving a radio resource control reconfiguration message from the network node to configure the remote user equipment for path switching via the candidate relay user equipment.

In accordance with the example embodiments as described in the paragraphs above, wherein the at least one non-transitory memory including computer program code storing instructions is executed by the at least one processor to cause the apparatus at least to perform: initiating a radio resource control connection re-establishment procedure with the source cell or the target cell, wherein the initiating is based on that the change of the serving cell or camping cell of the candidate relay user equipment detected one of after identifying the path switch decision or after receiving the radio resource control reconfiguration message from the network node to configure the remote user equipment for path switching via the candidate relay user equipment.

In accordance with the example embodiments as described in the paragraphs above, wherein the at least one non-transitory memory including computer program code storing instructions is executed by the at least one processor to cause the apparatus at least to perform: establishing a direct connection with the candidate relay user equipment being configured from the network node.

In accordance with the example embodiments as described in the paragraphs above, wherein the at least one non-transitory memory including computer program code storing instructions is executed by the at least one processor to cause the apparatus at least to perform: during or after the direct connection establishment, receiving from the candidate relay user equipment system information comprising a cell identification of a current serving cell or camping cell of the candidate relay user equipment used to identify a cell change of the candidate relay user equipment.

In accordance with the example embodiments as described in the paragraphs above, wherein the at least one message comprises the system information from the candidate relay user equipment received during or after the remote user equipment establishes the direct connection with the candidate relay user equipment.

In accordance with the example embodiments as described in the paragraphs above, wherein the candidate relay user equipment is in an idle or inactive state, and wherein the candidate relay user equipment in the idle or inactive state has performed cell reselection from the target cell to another cell causing the cell change of the candidate relay user equipment with a different at least one of serving cell identification or camping cell identification for the candidate relay user equipment.

In accordance with the example embodiments as described in the paragraphs above, wherein the updated measurement report comprises an updated candidate relay list indicating the different at least one of a serving cell identification or camping cell identification for the candidate relay user equipment.

In accordance with the example embodiments as described in the paragraphs above, wherein the updated measurement report is triggered based on the remote user equipment not yet receiving a radio resource control reconfiguration message from the network node to configure the remote user equipment for path switching via the candidate relay user equipment.

A non-transitory computer-readable medium (MEM 10B as in FIG. 5) storing program code (PROG 10C as in FIG. 5), the program code executed by at least one processor (DP 10A as in FIG. 5) to perform the operations as at least described in the paragraphs above.

In accordance with an example embodiment of the invention as described above there is an apparatus comprising: means for sending (TRANS 10D, MEM 10B, PROG 10C, and DP 10A as in FIG. 5), by a remote user equipment (UE 10 as in FIG. 5) of a source cell, towards a network node (gNB 12 as in FIG. 5) of the source cell a measurement report comprising a candidate relay list, wherein the candidate relay list comprises at least one of a serving cell identification or camping cell identification for at least one candidate relay user equipment for an indirect path switching from the source cell to a target cell associated with a candidate relay user equipment (NN 13 as in FIG. 5); means for detecting (TRANS 10D, MEM 10B, PROG 10C, and DP 10A as in FIG. 5) a change of a serving cell or camping cell of the candidate relay user equipment from the target cell to another cell based on receiving from the candidate relay user equipment at least one message that indicates at least one of serving cell identification or camping cell identification for the candidate relay user equipment is different than as reported to the network node in the measurement report; and means, based on the detecting, performing (TRANS 10D, MEM 10B, PROG 10C, and DP 10A as in FIG. 5) one of sending an updated measurement report towards the network node triggering renewing a path switch decision or initiating a radio resource control connection re-establishment procedure with the source cell or the target cell.

In the example aspect of the invention according to the paragraph above, wherein at least the means for sending, detecting, and performing comprises a non-transitory computer readable medium [MEM 10B as in FIG. 5] encoded with a computer program [PROG 10C as in FIG. 5] executable by at least one processor [DP 10A as in FIG. 5].

FIG. 6B illustrates operations which may be performed by a device such as, but not limited to, a relay user device (e.g., the UE 10 as in FIG. 5). As shown in step 650 of FIG. 6B there is determining, by a candidate relay user equipment, a change of a serving cell or camping cell from a first cell to a second cell for the candidate relay user equipment. As shown in step 655 of FIG. 6B there is sending at least one message indicating at least a cell identification of the second cell based on the determining towards a remote user equipment served by a source cell of a network node and in need of an indirect path switch via the candidate relay user equipment. As shown in step 660 of FIG. 6B wherein the sending causes an updated measurement report from the remote user equipment towards the network node triggering renewing a path switch decision or an initiated radio resource control connection re-establishment procedure from the remote user equipment with the source cell or the first cell.

In accordance with the example embodiments as described in the paragraph above, wherein the at least one message comprises a discovery message that indicates the at least one of serving cell identification or camping cell identification for the candidate relay user equipment.

In accordance with the example embodiments as described in the paragraphs above, wherein the at least one non-transitory memory including computer program code storing instructions is executed by the at least one processor to cause the apparatus at least to perform: establishing a direct connection with the remote user equipment, as requested by the remote user equipment.

In accordance with the example embodiments as described in the paragraphs above, wherein the at least one non-transitory memory including computer program code storing instructions is executed by the at least one processor to cause the apparatus at least to perform: during or after the direct connection establishment, sending towards the remote user equipment system information comprising a cell identification of a current serving cell or camping cell of the candidate relay user equipment used to identify a cell change of the candidate relay user equipment.

In accordance with the example embodiments as described in the paragraphs above, wherein the at least one message comprises the system information from the candidate relay user equipment sent during or after the remote user equipment establishes the direct connection with the candidate relay user equipment.

In accordance with the example embodiments as described in the paragraphs above, wherein the candidate relay user equipment is configured to send the system information based on the at least one message for every direct connection establishment after every determined cell change within a configured time interval starting from a time instance the cell change is determined at the candidate relay user equipment.

In accordance with the example embodiments as described in the paragraphs above, wherein the candidate relay user equipment is in an idle or inactive state.

In accordance with the example embodiments as described in the paragraphs above, wherein the candidate relay user equipment in the idle or inactive state has performed cell reselection from the first cell to the second cell causing the cell change of the candidate relay user equipment with a different at least one of serving cell identification or camping cell identification for the candidate relay user equipment.

In accordance with the example embodiments as described in the paragraphs above, wherein the candidate relay user equipment is configured to send one or more discovery messages as for the at least one message after every determined cell change within a configured time interval starting from a time instance the cell change is determined at the candidate relay user equipment.

In accordance with the example embodiments as described in the paragraphs above, wherein the sending is implemented in access stratum layer.

In accordance with the example embodiments as described in the paragraphs above, wherein the sending is implemented by upper layers above access stratum layer.

A non-transitory computer-readable medium (MEM 13B as in FIG. 5) storing program code (PROG 13C as in FIG. 5), the program code executed by at least one processor (DP

13A as in FIG. 5) to perform the operations as at least described in the paragraphs above.

In accordance with an example embodiment of the invention as described above there is an apparatus comprising: means for determining (TRANS 13D, MEM 13B, PROC 13C, and DP 13A as in FIG. 5), by a candidate relay user equipment (NN 13 as in FIG. 5), a change of a serving cell or camping cell from a first cell to a second cell for the candidate relay user equipment; and means for sending (TRANS 13D, MEM 13B, PROC 13C, and DP 13A as in FIG. 5) at least one message indicating at least a cell identification of the second cell based on the determining towards a remote user equipment served by a source cell of a network node (gNB 12 as in FIG. 5) and in need of an indirect path switch via the candidate relay user equipment, wherein the sending causes an updated measurement report from the remote user equipment towards the network node triggering renewing a path switch decision or an initiated radio resource control connection re-establishment procedure from the remote user equipment with the source cell or the first cell.

In the example aspect of the invention according to the paragraph above, wherein at least the means for determining and sending comprises a non-transitory computer readable medium [MEM 13B as in FIG. 5] encoded with a computer program [PROG 13C as in FIG. 5] executable by at least one processor [DP 13A as in FIG. 5].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and (c) hardware circuit(s) and or processor(s), such as a microprocessor(s) or a portion of a microprocessor(s), that requires software (e.g., firmware) for operation, but the software may not be present when it is not needed for operation."

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of non-limiting examples a full and informative description of the apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:

at least one processor; and at least one non-transitory memory including computer program code storing instructions that, when executed by the at least one processor, cause the apparatus at least to perform:

sending, by a remote user equipment of a source cell, towards a network node of the source cell a measurement report comprising a candidate relay list, wherein the candidate relay list comprises at least one of a serving cell identification or camping cell identification for at least one candidate relay user equipment for an indirect path switching from the source cell to a target cell associated with a candidate relay user equipment;

detecting a change of a serving cell or camping cell of the candidate relay user equipment from the target cell to another cell based on receiving from the candidate relay user equipment at least one message that indicates at least one of serving cell identification or camping cell identification for the candidate relay user equipment is different than as reported to the network node in the measurement report; and based on the detecting, performing one of sending an updated measurement report towards the network node triggering renewing a path switch decision or initiating a radio resource control connection re-establishment procedure with the source cell or the target cell, wherein the apparatus is further caused to perform:

establishing a PC5 direct connection with the candidate relay user equipment being configured from the network node; and during establishment of the PC5 direct connection, receiving from the candidate relay user equipment system information comprising System Information Block Type 1 (SIB1) including a cell identification of a current serving cell or camping cell of the candidate relay user equipment used to identify a cell change of the candidate relay user equipment, wherein the at least one message comprises the system information from the candidate relay user equipment received by the remote user equipment during establishment of the PC5 direct connection with the candidate relay user equipment.

2. The apparatus of claim 1, wherein the apparatus further caused to perform:

identifying a path switch decision to use the candidate relay user equipment of the candidate relay list being configured from the network node for the path switch, wherein the identifying is based on receiving a radio resource control reconfiguration message from the network node to configure the remote user equipment for path switching via the candidate relay user equipment.

3. The apparatus of claim 2, wherein the apparatus further caused to perform:

initiating a radio resource control connection re-establishment procedure with the source cell or the target cell, wherein the initiating is based on that the change of the serving cell or camping cell of the candidate relay user equipment detected one of after identifying the path switch decision or after receiving the radio resource control reconfiguration message from the network node to configure the remote user equipment for path switching via the candidate relay user equipment.

4. The apparatus of claim 1, wherein the candidate relay user equipment is in an idle or inactive state, and wherein the candidate relay user equipment in the idle or inactive state has performed cell reselection from the source cell to the target cell causing the cell change of the candidate relay user equipment with a different at least one of serving cell identification or camping cell identification for the candidate relay user equipment.

5. The apparatus of claim 1, wherein the updated measurement report comprises an updated candidate relay list indicating the different at least one of a serving cell identification or camping cell identification for the candidate relay user equipment.

6. The apparatus of claim 1, wherein the updated measurement report is triggered based on the remote user equipment not yet receiving a radio resource control reconfiguration message from the network node to configure the remote user equipment for path switching via the candidate relay user equipment.

7. The apparatus of claim 1, wherein the candidate relay list further comprises a relay user equipment identifier, a serving cell identification of the relay user equipment, and sidelink measurement quantity information including Sidelink Discovery-Reference Signal Received Power (SD-RSRP).

8. The apparatus of claim 1, wherein the remote user equipment filters relay user equipment candidates according to relay selection criteria before reporting and reports only relay user equipment candidates that fulfill higher layer criteria.

9. The apparatus of claim 1, wherein the remote user equipment is configured to trigger another measurement report when it receives a relay discovery message from a candidate relay user equipment and the relay discovery message indicates the relay user equipment's serving/camping cell identification is different from the one reported in the candidate relay list, and wherein the measurement report is triggered when the remote user equipment has not yet received a radio resource control reconfiguration message for path switching.

10. The apparatus of claim 3, wherein, if a cell identification in a newly received relay discovery message or identified from system information forwarded during establishment of the PC5 direct connection is not the same as a target cell identification indicated in a radio resource control reconfiguration message, the remote user equipment is triggered to initiate the radio resource control connection re-establishment procedure instead of responding with a radio resource control reconfiguration complete message.

11. The apparatus of claim 1, wherein, when the remote user equipment does not have enough time to identify the change of the camping cell of the relay user equipment and to send another or updated measurement report before a path switching decision, the remote user equipment requests PC5 connection establishment with the relay user equipment.

12. The apparatus of claim 1, wherein the change of the serving or camping cell of the relay user equipment occurs during a time period between the measurement report from the remote user equipment and PC5 direct connection establishment completed.

13. The apparatus of claim 1, wherein the source cell is served by a source gNB and the target cell is served by a target gNB different from the source gNB, and the indirect path switching is inter-gNB.

14. A method, comprising:

sending, by a remote user equipment of a source cell, towards a network node of the source cell a measurement report comprising a candidate relay list, wherein the candidate relay list comprises at least one of a serving cell identification or camping cell identification for at least one candidate relay user equipment for an indirect path switching from the source cell to a target cell associated with a candidate relay user equipment;

detecting a change of a serving cell or camping cell of the candidate relay user equipment from the target cell to a source cell based on receiving from the candidate relay user equipment at least one message that indicates at least one of serving cell identification or camping cell identification for the candidate relay user equipment is different than as reported to the network node in the measurement report; and based on the detecting, performing one of sending an updated measurement report towards the network node triggering renewing a path switch decision or initiating a radio resource control connection re-establishment procedure with the source cell or the target cell, wherein the method further comprises:

establishing a PC5 direct connection with the candidate relay user equipment being configured from the network node; and during establishment of the PC5 direct connection, receiving from the candidate relay user equipment system information comprising System Information Block Type 1 (SIB1) including a cell identification of a current serving cell or camping cell of the candidate relay user equipment used to identify a cell change of the candidate relay user equipment, wherein the at least one message comprises the system information from the candidate relay user equipment received by the remote user equipment during establishment of the PC5 direct connection with the candidate relay user equipment.

15. An apparatus comprising:

at least one processor; and at least one non-transitory memory including computer program code storing instructions that, when executed by the at least one processor, cause the apparatus at least to perform:

determining, by a candidate relay user equipment, a change of a serving cell or camping cell from a first cell to a second cell for the candidate relay user equipment; and sending at least one message indicating at least a cell identification of the second cell based on the determining towards a remote user equipment served by a source cell of a network node and in need of an indirect path switch via the candidate relay user equipment, wherein the sending causes an updated measurement report from the remote user equipment towards the network node triggering renewing a path switch decision or an initiated radio resource control connection re-establishment procedure from the remote user equipment with the source cell or the first cell, wherein the apparatus is further caused to perform:

establishing a PC5 direct connection with the remote user equipment, as requested by the remote user equipment; and during the direct connection establishment, sending towards the remote user equipment system information comprising System Information Block 1 (SIB1) including a cell identification of a current serving cell or camping cell of the candidate relay user equipment used to identify a cell change of the candidate relay user equipment, wherein the at least one message comprises system information from the candidate relay user equipment sent during the remote user equipment establishment of the PC5 direct connection with the candidate relay user equipment, wherein the candidate relay user equipment is configured to send the system information based on the at least one message for every PC5 direct connection establishment after every determined cell change within a configured time interval starting from a time instance the cell change is determined at the candidate relay user equipment, wherein the candidate relay user equipment is configured to send one or more discovery messages as for the at least one message after every determined cell change within a configured time interval starting from a time instance the cell change is determined at the candidate relay user equipment, wherein the sending is implemented by upper layer with cross layer interaction upon receiving the change or update of cell identification from access stratum layer at the relay user equipment, wherein when the candidate relay user equipment selects a new cell or is handed over to a new cell, the access stratum layer of the candidate relay user equipment indicates to the upper layer comprising a non-access stratum layer or an application layer, a cell identification of the new cell and triggers the upper layer that is responsible for controlling and managing relay discovery message transmissions to send one or more additional relay discovery messages.

16. The apparatus of claim 15, wherein the candidate relay user equipment is in an idle or inactive state, and wherein the candidate relay user equipment in the idle or inactive state has performed cell reselection from the first cell to the second cell causing the cell change of the candidate relay user equipment with a different at least one of serving cell identification or camping cell identification for the candidate relay user equipment.

* * * * *